United States Patent
Ogawa et al.

(10) Patent No.: US 8,270,271 B2
(45) Date of Patent: *Sep. 18, 2012

(54) OPTICAL RECORDING MEDIUM AND INFORMATION RECORDING METHOD

(75) Inventors: Ippei Ogawa, Kanagawa (JP); Takuo Ohishi, Kanagawa (JP); Takanobu Matsuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 457 days.

This patent is subject to a terminal disclaimer.

(21) Appl. No.: 12/149,652

(22) Filed: May 6, 2008

(65) Prior Publication Data

US 2009/0154320 A1    Jun. 18, 2009

Related U.S. Application Data

(60) Division of application No. 10/952,918, filed on Sep. 30, 2004, now Pat. No. 7,403,457, which is a continuation of application No. PCT/JP2004/003398, filed on Mar. 15, 2004.

(30) Foreign Application Priority Data

Mar. 25, 2003  (JP) ................................. 2003-083619
Nov. 11, 2003  (JP) ................................. 2003-381189

(51) Int. Cl.
G11B 7/0045    (2006.01)
(52) U.S. Cl. ...................................... 369/47.53; 369/94
(58) Field of Classification Search .................... 369/94
See application file for complete search history.

(56) References Cited

U.S. PATENT DOCUMENTS

| | | | |
|---|---|---|---|
| 5,202,875 A | 4/1993 | Rosen et al. | |
| 5,353,270 A | 10/1994 | Iimura | |
| 5,617,405 A | 4/1997 | Victoria et al. | |
| 5,650,991 A * | 7/1997 | Fujiie | 369/53.22 |
| 5,867,463 A | 2/1999 | Chiba | |
| 5,878,007 A * | 3/1999 | Matsumoto et al. | 369/44.34 |
| 5,982,723 A | 11/1999 | Kamatani | |
| 6,038,208 A | 3/2000 | Shikunami et al. | |
| 6,078,560 A * | 6/2000 | Kashiwagi | 369/275.5 |
| 6,141,299 A | 10/2000 | Utsumi | |
| 6,147,941 A | 11/2000 | Kumagai | |
| 6,266,318 B1 * | 7/2001 | Honda et al. | 369/275.3 |

(Continued)

FOREIGN PATENT DOCUMENTS

EP        0 517 490        12/1992

(Continued)

OTHER PUBLICATIONS

MAT (machine assisted translation) of JP-2001-052337—No Date.

*Primary Examiner* — Wayne Young
*Assistant Examiner* — Brian Butcher
(74) *Attorney, Agent, or Firm* — Dickstein Shapiro LLP

(57) ABSTRACT

An optical recording medium has a multi-layer structure recording layer structure recording layer portion including plural recording layers provided with tracks for guiding a recording light and being adapted to record data, where recording condition information and recording layer identification information for the recording layers are recorded on the tracks as information signals. Test writing is conducted on a recording layer that is subject to recording to derive a suitable recording condition based on recording condition information that is recorded on the recording layer, and direct recording is conducted according to a direct recording condition.

10 Claims, 10 Drawing Sheets

U.S. PATENT DOCUMENTS

| | | |
|---|---|---|
| 6,280,810 B1 | 8/2001 | Nakamura et al. |
| 6,301,210 B1 * | 10/2001 | Yamazaki et al. ......... 369/47.25 |
| 6,388,978 B1 | 5/2002 | Ogawa et al. |
| 6,424,614 B1 * | 7/2002 | Kawamura et al. ........ 369/275.3 |
| 6,497,935 B1 | 12/2002 | Ogawa |
| 6,535,477 B1 | 3/2003 | Muramatsu et al. |
| 6,562,432 B2 | 5/2003 | Ogawa et al. |
| 6,580,684 B2 | 6/2003 | Miyake et al. |
| 6,649,240 B2 | 11/2003 | Ohishi |
| 6,744,718 B1 * | 6/2004 | Choi et al. ................. 369/59.25 |
| 6,845,071 B2 * | 1/2005 | Shoji et al. ................. 369/47.53 |
| 6,865,340 B1 | 3/2005 | Heo et al. |
| 7,027,371 B2 | 4/2006 | Nobukuni et al. |
| 7,035,185 B2 | 4/2006 | Watabe |
| 7,142,496 B2 * | 11/2006 | Miyagawa et al. ......... 369/59.11 |
| 7,193,948 B2 * | 3/2007 | Furukawa et al. ......... 369/59.11 |
| 7,639,584 B2 * | 12/2009 | Kim et al. .................. 369/59.25 |
| 2002/0054550 A1 | 5/2002 | Tomita |
| 2002/0085462 A1 | 7/2002 | Spruit |
| 2002/0136122 A1 | 9/2002 | Nakano |
| 2003/0058771 A1 | 3/2003 | Furukawa et al. |
| 2003/0215673 A1 | 11/2003 | Mikami et al. |
| 2004/0160891 A1 | 8/2004 | Spruit et al. |
| 2004/0165509 A1 | 8/2004 | Ogawa |
| 2005/0226116 A1 | 10/2005 | Kubo et al. |

FOREIGN PATENT DOCUMENTS

| | | |
|---|---|---|
| EP | 001331631 * | 7/2003 |
| JP | 5-151644 | 6/1993 |
| JP | 10 222874 | 8/1998 |
| JP | 10-269575 | 10/1998 |
| JP | 2000-123416 | 4/2000 |
| JP | 2000-311346 | 11/2000 |
| JP | 2001-052337 | 2/2001 |
| JP | 2002 042349 | 2/2002 |
| JP | 2002-50053 | 2/2002 |
| JP | 2002-150568 | 5/2002 |
| JP | 2003-501777 | 5/2002 |
| JP | 2003-022532 | 1/2003 |
| JP | 2003-030842 | 1/2003 |
| JP | 2003-501777 | 1/2003 |
| JP | 2005-63628 | 3/2005 |
| WO | WO 02/29791 A1 | 4/2002 |

* cited by examiner

RECORDING/REPRODUCING LIGHT

OPTICAL RECORDING MEDIUM AND INFORMATION RECORDING METHOD

CROSS-REFERENCE TO RELATED APPLICATION

This application is a divisional application of U.S. application Ser. No. 10/952,918, filed Sep. 30, 2004 now U.S. Pat. No. 7,403,457, which is a U.S. continuation application filed under 35 USC 111(a) claiming benefit under 35 USC 120 and 365(c) of PCT application JP2004/003398, filed Mar. 15, 2004, which claims priority to Japanese Patent Application Serial No. 2003-083619 filed on Mar. 25, 2003, and Japanese Patent Application Serial No. 2003-381189 filed on Nov. 11, 2003. The foregoing applications are hereby incorporated herein by reference in their entirety.

TECHNICAL FIELD

The present invention relates to an optical recording medium and an information recording method. The present invention particularly relates to an optical recording medium having a multi-layer structure recording layer portion including plural recording layers each having a track for guiding a recording light, and being adapted to record user data.

BACKGROUND ART

Recordable type DVDs (Digital Versatile Disk) include the DVD+R (DVD Recordable) and the DVD+RW (DVD Rewritable), for example. Such recordable type DVDs have high reproducing compatibility with a one-sided single layer read-only type DVD. Thus, much research and development are being conducted to increase the recording speed and recording capacity of such recordable type disk media.

In an optical recording medium that has plural recording layers arranged into a multi-layer structure, a recording/reproducing light directed to a recording layer that is positioned far off with respect the incidence surface of the recording/reproducing light passes through the recording layers positioned closer towards the incidence surface. Thus, in an optical recording medium in which recording is realized by changing the optical characteristics of a recording layer through changing the recording light intensity, the waveform condition and intensity condition for the recording light differs depending on each recording layer. Also, in the case of successively realizing recording on plural recording layers, the waveform condition and the intensity condition for the recording light changes from the initial conditions set at the start of the recording owing to heat generated during the recording of the recording information, for example. Thus, a waveform condition and intensity condition that differ from those for an optical recording medium with a single recording layer have to be set for a multi-layer optical recording medium.

In response to the above considerations, for example, Japanese Laid-Open Patent Publication No. 2002-50053 discloses providing unique information of a data layer such as identification information of the data layer and recording conditions for the data layer in a low reflectance region and a high reflectance region that are alternatingly arranged with respect to an extending direction of the recording tracks to realize a bar code like arrangement.

However, the method disclosed in Japanese Laid-Open Patent Publication No. 2002-50053 is implemented under the premise that the unique information of a data layer may be read without conducting tracking servo, and thereby, an optical pickup may not be able to read the data layer unique information through normal operations. Furthermore, the information region for the data layer unique information, namely, the portion corresponding to the bar code information region cannot be used for information recording, and thereby, recording information density is significantly reduced.

SUMMARY OF THE INVENTION

It is a general object of the present invention to provide a new and useful optical recording medium and information recording method that can solve the problems of the related art.

A more specific object of the present invention is to provide an optical recording medium that has a multi-layer structure with plural recording layers in which a recording condition suitable for each recording layer may be recognized through normal optical pickup operations to realize a suitable recording operation. Another object of the present invention is to provide an information recording method for recording information on such an optical recording medium.

It is also an object of the present invention to enable reading of recording conditions without receiving influence from a recording signal of a data region.

It is also an object of the present invention to enable reading of recording conditions while reducing excessive movement of the optical pickup.

A more specific object of the present invention is to provide an optical recording medium having a multi-layer structure with plural recording layers each having tracks for guiding recording light, wherein user data may be recorded on each recording layer, and information pertaining to recording conditions for the respective recording layers and layer information for identifying the respective layers are provided as information signals on the respective tracks. In the optical recording medium of the present invention (first optical recording medium), by providing information pertaining to the recording conditions of the respective recording layers and the layer information for identifying the respective recording layers as information signals on the respective tracks, recording conditions suitable for each recording layer may be recognized by normal operations of the optical pickup of following the tracks, and suitable recording operations can be realized.

A more specific object of the present invention is to provide an optical recording medium comprising:

a plurality of recording layers having tracks for guiding recording light that are arranged into a multi-layer structure, the recording layers being adapted to record user data;

wherein recording condition information and recording layer identification information for the recording layers are provided on the recording layers as track information signals.

According to the optical recording medium of the present invention (first optical recording medium), the recording condition information and recording layer identification information for the recording layers may be provided as information signals on tracks (guide pits or guidance grooves) so that a recording condition suitable for each recording layer may be recognized through normal optical pickup operations of following the tracks and desirable recording operations may be realized.

According to an embodiment of the present invention (second optical recording medium), the recording condition information and recording layer identification information may be preformatted on the tracks as track information signals. Although the recording condition information and recording layer identification information may be recorded as normal pits or recording marks, by preformatting the information on the tracks as track information signals, the information may be embedded without reducing a data region.

According to another embodiment of the present invention (third optical recording medium), the multi-layer structure recording layers may alternatingly include a groove track and a land track as recording positions depending on whether the recording layers as odd numbered or even numbered with respect to a layering order. According to the present invention, information may be recorded as tracks on the grooves, the lands, or both the groves and the lands of the multi-layer structure recording layers as is the case in conventional arrangements; however, the present invention may also apply to a case in which the recording positions are alternatingly arranged to correspond to a groove track and a land track depending on whether the recording layers are odd numbered or even numbered.

According to another embodiment of the present invention (fourth optical recording medium), the recording condition information and recording layer identification information may be preformatted as pits or grooves that form the tracks. By preformatting the recording condition information and recording layer identification information as pits or grooves that are formed on transparent substrates as tracks, the optical recording medium may be easily manufactured at a low cost.

According to another embodiment of the present invention (fifth optical recording medium), the recording condition information and recording layer identification information may be preformatted on the tracks as track information signals through phase modulation. The recording condition information and recording layer identification information may be recorded on the tracks through various methods such as periodic modulation and amplitude modulation, for example; however, in the case of a recording medium conforming to the DVD+R/RW standard having a synchronization signal with a high frequency of 100 kHz, phase modulation is preferably used.

According to another embodiment of the present invention (sixth optical recording medium), the recording condition information may include information pertaining to at least one of an intensity condition for the recording light and a light emission waveform condition for the recording light. The recording condition information may include various conditions such as recording light intensity condition, wavelength condition, phase condition, wave surface condition, and light emission waveform condition. However, by using at least one of the recording light intensity condition and the light emission waveform condition, the recording condition may be easily adjusted by a single light emitting element.

According to another embodiment of the present invention (seventh optical recording medium), the recording condition information may include information that directly designates a recording condition. With this arrangement, the recording condition may be easily and accurately set by simply reading the recording condition information.

According to another embodiment of the present invention (eighth optical recording medium), the recording condition information, may include indirect information that designates a condition for deriving a recording condition. In this case, the recording condition may not be immediately set by simply reading the recording condition information; however, the recording condition can be obtained from the deriving condition, and the amount of information required may be reduced compared to the direct recording condition information.

According to another embodiment of the present invention (ninth optical recording medium), the recording condition information and recording layer identification information may be positioned away from a data region of the tracks. The signal to noise ratio (SNR) of the signals recorded on the tracks changes when information is recorded on a recording layer, thereby, the recording position for recording the recording condition information is preferably located away from the data region, and in the case of a spiral or concentric track, the data region is usually located at the middle diameter portion of, and thereby, the recording condition information is preferably recorded on at least one of an inner diameter portion and an outer diameter portion.

According to another embodiment of the present invention (10th optical recording medium), the tracks are each arranged into a spiral configuration on the recording layers, the recording condition information and recording layer identification information are provided at an inner diameter portion of the spiral configuration of a corresponding track if a spiraling direction of a recording operation for the corresponding track is directed from an inner diameter side to an outer diameter side, and the recording condition information and recording layer identification information are provided at an outer diameter portion of the spiral configuration of a corresponding track if a spiraling direction of a recording operation for the corresponding track is directed from the outer diameter side to the inner diameter side. Tracks of an optical recording medium often have spiral configurations, and by recording the recording condition information on the inner diameter portion or the outer diameter portion depending on whether the spiraling direction of the track extends from the inner diameter side to the outer diameter side or vice versa, the recording condition information position may be arranged so that the optical pickup may access the recording condition first upon initiating a recording operation with respect to a recording layer. Thereby, the optical pickup may read the recording condition information and then proceed directly to its recording operation without requiring excess movement.

According to another embodiment of the present invention (11th optical recording medium), the tracks may each be arranged into a spiral configuration on the recording layers; a test writing region for determining a recording condition is provided at an inner diameter portion of the spiral configuration of a corresponding track if a spiraling direction of a recording operation for the corresponding track is directed from an inner diameter side to an outer diameter side; and a test writing region is provided at an outer diameter portion of the spiral configuration of a corresponding track if a spiraling direction of a recording operation for the corresponding track is directed from the outer diameter side to the inner diameter side. Although test writing is generally conducted to determine a recording condition, by providing a test writing region on each of the recording layers, and arranging the test region to be positioned at the inner diameter portion or the outer diameter portion according to the spiraling direction of the tracks, the optical pick up may conduct the test writing and then proceed directly to the recording operation without requiring excess movement.

According to another embodiment of the present invention (12th optical recording medium), the respective recording condition information and recording layer identification information for the recording layers may be arranged to be recorded on the corresponding recording layers. By providing the recording condition information each individual recording layer, the recording condition of each recording layer may be accurately set, and the recording condition may be set for each recording layer. Thereby, even when a recording layer is added, the recording condition format may not have to be changed and may be expansively applied so that compatibility may be easily realized with a single-layer optical recording medium.

According to another embodiment of the present invention (13th optical recording medium), information that directly designates a recording condition is recorded as recording condition information on a first recording layer of the recording layers on which a recording is to be conducted first; and indirect information that designates a condition for deriving a recording condition based on the recording condition of the first recording layer is recorded as recording condition information on a remaining second recording layer of the recording layers. In this case, the amount of information required for the recording information may be reduced in the second recording layer and onward compared to the case of recording the recording condition information for each individual recording layer.

According to another embodiment of the present invention (14th optical recording medium), the recording condition information for all the recording layers may be recorded on a first recording layer of the recording layers on which a recording is to be conducted first. In this case, the recording condition information for all the recording layers may be recorded on the first recording layer on which recording is to be conducted first so that from the second recording layer and onward, only the recording layer identification information may have to be read, and the recording condition may not have to be read.

According to another embodiment of the present invention (15th optical recording medium), the recording condition information may include information pertaining to a recording condition fluctuation with respect to a temperature or a recording light wavelength. In a multi-layer optical recording medium, the amount of heat accumulated within a recording apparatus varies depending on whether recording is individually conducted on each recording layer, or recording is successively conducted on all the recording layers, and in turn, environmental conditions such as the temperature may significantly vary. Particularly, in the case of using light emitting element such as a laser diode as a light source, there is likely to be a significant fluctuation in the wavelength depending on the temperature. In this respect, by including information pertaining to the recording condition fluctuation with respect to the temperature or the recording light wavelength, a suitable recording condition may be set according to the temperature or wavelength variation.

According to another embodiment of the present invention (16th optical recording medium), a first recording layer of the recording layers on which a recording is to be conducted first may correspond to a recording layer of the recording layers that is positioned closest to a recording light incidence side. By arranging the first recording layer to correspond to the recording layer positioned closest to the recording light incidence side which receives the least influence from other recording layers, the recording condition may be appropriately read.

According to another embodiment of the present invention (17th optical recording medium), the first recording layer of the recording layers on which a recording is to be conducted first corresponds to a recording layer of the recording layers that is positioned farthest from a recording light incidence side. By arranging the first recording layer to correspond to the recording layer that is positioned farthest with respect to the recording light incidence side, recording may be conducted on the closer recording layer(s) without receiving influence from the preceding recording layer(s) including the first recording layer, and thereby, stable recording may be realized.

According to another embodiment of the present invention (18th optical recording medium), the recording layers are adapted to be transmissive with respect to a recording light wavelength and arranged on substrates having the tracks of the recording layers formed thereon. In this case, the optical recording medium of the present invention may be easily provided at a low cost.

According to another embodiment of the present invention (19th optical recording medium), the optical recording medium of the present invention may conform to a DVD+R standard, and the recording layers may be arranged into a one-sided dual layer configuration. Accordingly, the present invention may be suitably applied to recordable type optical recording medium conforming to the DVD+R standard and having a one-sided dual layer structure.

According to another embodiment of the present invention (20th optical recording medium), the optical recording medium of the present invention may conform to a DVD+RW standard, and the recording layers may be arranged into a one-sided dual layer configuration. Accordingly, the present invention may be suitably applied to recordable type optical recording medium conforming to the DVD+R standard and having a one-sided dual layer structure.

Another specific object of the present invention is to provide an information recording method for recording information on an optical recording medium including a plurality of recording layers having tracks for guiding recording light that are arranged into a multi-layer structure, the recording layers being adapted to record user data, and recording condition information and recording layer identification information for the recording layers being provided on the recording layers as track information signals, the method including:

a condition reading step of reading recording condition information and recording layer identification information provided as track information in the optical recording medium;

a recording condition setting step of setting a recording condition for a recording layer that is subject to recording based on the recording condition information and recording layer identification information for said recording layer that are read in the condition reading step; and a recording operation execution step of executing a recording operation on the recording layer that is subject to recording according to the recording condition set in the recording condition setting step.

According to the information recording method of the present invention, even in a multi-layer optical recording-medium having plural recording layers, recording condition information and recording layer identification information for a recording layer provided as track information may be read, and the recording condition for the recording layer may be set before executing a recording operation so that suitable recording may be conducted according to a suitable recording condition for each recording layer.

Another specific object of the present invention is to provide an optical recording medium, including:

a multi-layer structure recording layer portion including a plurality of recording layers having tracks for guiding recording light and being adapted to record data;

wherein recording condition information and recording layer identification information for the recording layers are recorded as information signals on the tracks of the recording layers.

According to the optical recording medium of the present invention, information such as recording condition information may be recognized through normal optical pickup operations of following the track, and appropriate recording may be realized.

Another object of the present invention is to provide a recording method for recording data on an optical recording medium having a multi-layer structure recording layer portion that includes a plurality of recording layers having tracks for guiding a recording light and being adapted to record data, where recording condition information and recording layer identification information for the recording layers are recorded as information signals on the tracks of the recording layers, the recording method including the steps of:

reading at least one of the information signals from the optical recording medium;

setting a recording condition for a recording layer that is subject to recording based on the read information signal; and recording data on the recording layer that is subject to recording according to the set recording condition.

According to the recording method of the present invention, suitable recording may be conducted according to a suitable recording condition for each of the recording layers.

Further, other objects and features of the present invention are described with reference to the accompanying drawings.

DESCRIPTION OF THE PREFERRED EMBODIMENTS

In the following, a description is given, with reference to the drawings, of embodiments of the optical recording medium and information recording method of the present invention.

[Basic Structure of Optical Recording Medium]

Figure 1:
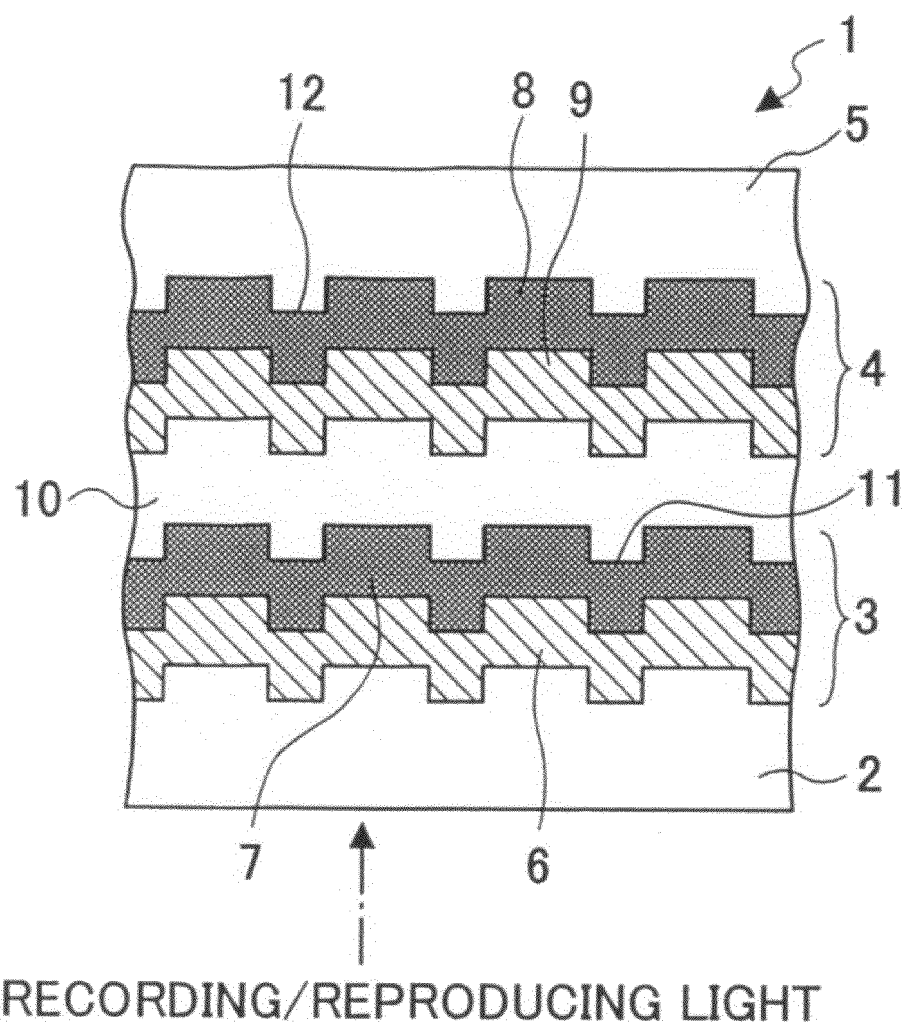
FIG. 1 is a cross-sectional diagram showing an optical recording medium according to an embodiment of the present invention.

According to one aspect, the present invention may be applied to an optical recording medium having a multi-layer structure in which plural recording layers are layered with respect to the incidence direction of a recording/reproducing light. FIG. 1 is a cross-sectional diagram showing an optical recording medium according to an embodiment of the present invention. FIG. 1 shows a one-sided dual layer optical recording medium 1 in which recording/reproducing light is irradiated on one recording side. The optical recording medium 1 includes a transparent substrate 2, a first recording layer 3, a second recording layer 4, and a transparent substrate 5 that are layered on top of each other in the above order. The first recording layer 3 has a layer structure including a recording film 6 that is formed on the transparent substrate 2 and a reflection film 7 that is formed on the recording film 6. The second recording layer 4 has a layer structure including a reflection film 8 that is formed on the transparent substrate 5 and a recording film 9 that is formed on the reflection film 8. The first recording layer 3 and the second recording layer 4 having the layer structures are bonded by a bonding film 10.

In the following, each of the layers of the optical recording medium 1 is described in greater detail.

First, for the recording films 6 and 9, a material that changes its physical form or optical characteristics due to thermal or optical influences from irradiation of recording light is preferably used. For example, if the optical recording medium 1 corresponds to a recordable type one-sided dual layer optical recording medium conforming to the DVD+R standard, and an organic dye material is used, metal complex dyes such as azo dyes, cyanine dyes, phthalo cyanine dyes, pyrylium dyes, azulenium dyes, squarylium dyes, Ni, and Cr, or nephtoquinones, anthraquinone dyes, indophenol dyes, indoaniline dyes, triphenylmethane dyes, triarylmethane dyes, aminiums, diimmonium dyes, and formazan metal chelates. Particularly, azo dyes, squarylium dyes, formazan metal cheltaes that have good optical resistance characteristics are preferred organic dye materials. Further, the organic dye material may include a third component such as a binder, or a stabilizer. As for the formation method of the organic dye material, the organic dye may be developed in a solvent and applied using the spin coating method, or sputtering in vacuum may be conducted to form the film layer. The film thicknesses of the recording films 6 and 9 are preferably within a range of 300-5000 Å and more preferably within a range of 700-2000 Å. In the case where the spin coating method is used, annealing at a high temperature is preferably performed in order to remove the residue solvent. The annealing temperature is preferably within a range of 80~110° C., and more preferably around 100° C. The annealing time period is preferably within a range of 15~30 minutes.

It is noted that in a case where the optical recording medium 1 corresponds to a rewritable type one-sided dual layer optical recording medium conforming to the DVD+RW standard on which information is recorded by changing the atomic arrangement of the recording layers, a phase change material may be used instead of an organic dye material. In this case, the recording films 6 and 9 include a film made of the phase change material and a heat insulating film for maintaining the heat of the phase change material. As a specific example, the recording films 6 and 9 may be made of a metal alloy represented as $X_A$—$X_B$—$X_C$—Ge—Te; wherein $X_A$ may correspond to at least one of the following elements: Cu, Ag, Au, Sc, Y, Ti, Zr, V, Nb, Cr, Mo, Mn, Fe, Ru, Co, Rh, Ni, Pd, Hf, Ta, W, Ir, Pt, Hg, B, C, N, P, O, S, Se, lanthanide, actinide, alkaline earth metal, and inactive gas elements; $X_B$ may correspond to at least one of the following elements: halogen elements such as Cl and I, and alkaline metal such as Na; and $X_C$ may correspond to at least one of the following elements: Sb, SN, As, Pb, Bi, Zn, Cd, Si, Al, Ga, and In. Also, it is noted that metal materials such as metal elements Tb, Fe, and Co that are used as magneto-optic materials may be used in the recording films 6 and 9. The protective films of the recording films 6 and 9 may be made of the same material or they may be made of different materials. Specifically, each of the protective films may be made of an oxide such as SiO, $SiO_2$, ZnO, $SNO_2$, $Al_2O_3$, $TiO_2$, $In_2O_3$, MgO, and $ZrO_2$; a nitride such as Si3N4, AlN, TiN, BN, and ZrN; a sulfide such as ZnS, In2S3, and TaS4; a carbide such as SiC, TaC, B4C, Wc, TiC, and ZrC; a diamond-shaped carbon; or a combination of two or more of the above materials. As for the formation method of the protective films, sputtering, ion plating, vacuum deposition, or plasma CVD, for example, may be used.

The reflection films 7 and 8 correspond to silver films formed through sputtering, for example. As the material of the reflection films 7 and 8 metal such as aluminum, silver, copper, or metal alloys containing the above materials as their main component may be used. Particularly, metal or metal alloys containing gold as their main component may preferably be used as the material of the reflection films 7 and 8. When silver is mainly used, the atomic concentration of silver is preferably within a range of 80~100%, and more preferably within a range of 90~100%. Also, aluminum may be used as the material of the reflection films 7 and 8 since aluminum is inexpensive and is known to be used in compact disks (CD). In the case of using a metal or a metal alloy as the metal film material, the film may be formed using a vacuum film deposition method such as sputtering or vacuum vapor deposition. In this case, a technique may be applied of changing the degree of vacuum within the vacuum chamber (e.g., approximately $10^{-5}$ torr) in performing sputtering to form a film that varies in density or crystallization states so that the reflectance of the film may be increased. In a case where at least one recording layer is placed below the reflection film 7 and 8 with respect to the incident direction of the recording/reproducing light, the reflection films 7 and 8 need to be semi-transparent so as to allow the reflection light to pass through. Thereby, the film thicknesses of the reflection films 7 and 8 are preferably between 300 Å and 1000 Å.

The transparent substrates 2 and 5 corresponding to bases of the recording films 6 and 9 are preferably made of material that is transmissive with respect to the wavelength of the recording/reproducing light. For example, plastic such as polycarbonate, acryl resin, polymetacrylate methyl, polystyrene resin, vinyl chloride resin, or epoxy resin; or glass may be used. It is noted, however, that other materials may also be used. Upon considering factors such as facility in formation, cost, and weight differences of the material, polycarbonate or acryl resin may preferably be used. With respect to each pair of the recording film 6 and the reflection film 7, and the recording film 9 and the reflection film 8, the recording films 6 and 9 have to be positioned toward the incidence direction of the recording/reproducing light. Thereby, the order of the recording films and the reflection films with respect to the transparent substrates 2 and 5 is such that if the incident light passes through the transparent substrate to reach the recording layer, the transparent substrate 2, the recording film 6, and the reflection film 7 are preferably arranged in this order. If the incident light does not pass through the transparent substrate to reach the recording layer, the transparent substrate 5, the reflection film 8 and the recording film 9 are preferably arranged in this order.

On the reflection films 7 and 8, guide trenches (or guide pits=pre-pits) 11 and 12 corresponding to tracks for guiding the recording light are formed. As for their preferred formation method with regard to manufacturing facility and costs, the guide trenches (or guide pits) 11 and 12 may be formed on the transparent substrates 2 and 5 and the reflection films 7 and 8 may be formed thereon. In a case where detection is conducted based on interference caused by the path difference of the recording/reproducing light at the region of the guide trenches (or guide pits) 11 and 12 and other regions, the depth of the guide trenches (or guide pits) 11 and 12 is preferably equal to $\lambda/8n$, where n represents the refractive index of the transparent substrates 2 and 5, and $\lambda$ represents the wavelength of the recording light.

The guide trenches (or guide pits) 11 and 12 for guiding the recording light are arranged to guide the recording light to accurately scan the recording region of the optical recording medium 1, and are generally provided with synchronization signals for enabling the recording light to scan the optical recording medium at a designated line speed. In such case, the guide trenches 11 and 12 are generally wobbled at predetermined intervals. In order to record information such as recording condition information on the guide trenches (guide pits) 11 and 12, the synchronization signals generated from the guide trenches (guide pits) 11 and 12 are preferably modulated through periodic modulation, amplitude modulation, or phase modulation, for example. In the case of the optical recording medium 1 of the present embodiment, since there may be a wide variation in the intensity of the reflection light depending on the state of the optical recording medium 1, periodic modulation and phase modulation are preferred rather than amplitude modulation. Further, in the DVD+R/RW where the synchronization signal has a high frequency of 100 kHz, phase modulation is preferred.

According to a preferred method of manufacturing the multi-layer structure of the recording films 6 and 9, the recording films 6 and 9, and the reflection films 7 and 8 are formed on the transparent substrate 2 and 5, after which the substrates 2 and 5 are bonded together. In such case, an adhesive sheet, a thermosetting adhesive, a UV cure adhesive, or a cationic UV cure adhesive may preferably be used as the bonding film 10. Particularly, to achieve smoothness and evenness in the bonding film 10, an adhesive sheet is preferably used as the bonding film 10.

In the optical recording medium 1 having a multi-layer structure with plural recording layers 3 and 4 that are formed according to the above-described procedures, the recording layers 3 and 4 each have differing environmental conditions such as optical conditions and thermal conditions of the incident recording light, and thereby, high quality recording cannot be realized on these recording layers using the same recording condition. It is noted that the "optical conditions" may correspond to intensity change of the recording light that occurs when the recording light passes through the recording layer that is positioned toward the recording light incidence surface (first recording layer 3) and reaches the recording layer that is positioned further away from the recording light incidence surface (second recording layer 4), a difference in the optical path length from passing plural transparent substrates, and a phase change caused by birefringence of the transparent substrate 2. Also, the "thermal conditions" may correspond to heat accumulation and heat emission conditions of the recording layer 3 and 4 depending on the positioning and thickness differences of the recording films 6 and 9, the reflection films 7 and 8, the transparent substrates 2 and 5, and the bonding film 10.

By selecting suitable recording conditions for each of the recording layers 3 and 4 according to the differences in the environmental conditions of the recording layers 3 and 4, high quality recording on plural recording layers 3 and 4 may be realized. The recording conditions may include the intensity, wavelength, phase, wave surface, light emission waveform of the recording light, for example. It is noted that the intensity condition and the light emission waveform condition are preferably used since such conditions may be easily adjusted using a single light emitting element.

The recording condition information content may correspond to a direct condition such as a numerical value designating the intensity or the waveform of the recording light, or an indirect condition such as a condition for deriving a recording condition through test writing on the optical recording medium 1 or based on the reflectance fluctuation of the optical recording medium 1. As an exemplary method for deriving a recording condition, the β method used in a CD-R or a DVD±R, or the γ method used in a CD-RW or a DVD±RW to derive an intensity condition for the recording light may be used. In this case, β or γ, which corresponds to a target, and an approximate recording intensity for use in the condition derivation process are included as the recording condition information content. In another example, test writing may be successively performed while changing the waveform condition to obtain a suitable waveform condition. In yet another example, the thickness of the recording film and the transmittance of the transparent substrate may be estimated from a change in reflectance, and a suitable recording condition may be obtained accordingly. By using the above exemplary methods of deriving a recording condition, the physical differences of the recording layers within the optical recording medium 1 are taken into account, and the amount of information to be recorded as recording condition information on the guide trenches (or guide pits) 11 and 12 corresponding to tracks may be reduced.

In the optical recording medium 1 having plural recording layers 3 and 4, if a suitable recording condition is to be derived by conducting test writing, it is preferred that a test writing region be provided on each of the recording layers 3 and 4. Also, by conducting the test writing for all the recording layers 3 and 4 at the beginning of a recording operation to derive a suitable recording condition for each of the recording layers 3 and 4, the test writing time required during recording may be reduced in successively recording on the recording layers 3 and 4. However, optical conditions such as the wavelength and efficiency of the light emitting element may change due to environmental condition changes such as a change in temperature during recording, and in turn, the suitable recording condition at the time of the actual recording may differ from that determined at the beginning of the recording operation. Thereby, information pertaining to sensitivity fluctuation of each of the recording films 6 and 9 with respect to wavelength and/or temperature may be included in the recording condition information, and a condition calculated based on the sensitivity fluctuation of the recording films 6 and 9 caused by a change in an environmental condition such as the temperature may be supplemented to the recording condition derived at the beginning of the recording operation so that a suitable recording condition for each of the recording layers 3 and 4 may be obtained at the beginning of the recording operation.

It is noted that the signal to noise ratio (SNR) of the signal of the guide trenches (guide pits) 11 and 12 corresponding to tracks changes after information is recorded on the recording layers 3 and 4. Thereby, the recording positions of the recording condition information for the recording layers 3 and 4 that are to be recorded on the guide trenches (guide pits) 11 and 12 of the optical recording medium 1 are preferably located away from data regions on which arbitrary information may be recorded by a user. In a case where the guide trenches (guide pits) 11 and 12 are arranged into concentric configurations or spiral configurations, the data region is usually located at a mid-diameter portion of the trench, and thereby, the recording condition information is preferably recorded on at least one of an inner diameter portion or an outer diameter portion of the trench.

Further, in a case where the guide trench (guide pits) 11 and 12 are arranged into a spiral configuration, the entire surface of the optical recording medium 1 may be successively scanned when the optical recording medium 1 is rotated for recording/playback. In this case, in order to eliminate excess movement of the optical pickup at the beginning of a recording operation, the recording condition information is preferably recorded at the position at which the optical pickup starts its recording operation for the corresponding recording layer (i.e., the inner diameter portion or the outer diameter portion). Specifically, the recording condition information is preferably recorded at the inner diameter portion if the spiraling direction with respect to the rotation direction of the optical recording medium 1 for recording/playback runs from the inner diameter side to the outer diameter side, and the recording condition information is preferably recorded at the outer diameter portion if the spiraling direction runs from the outer diameter side to the inner diameter side.

Also, by determining the recording conditions through conducting test writing on the optical recording medium 1, suitable recording conditions for the recording layers 3 and 4 that take into account environmental conditions such as temperature and humidity may be derived. In such case, the test writing region is preferably provided at a position at which the optical pickup starts its recording operation for the corresponding recording layer (i.e., inner diameter portion or outer diameter portion) so as to obtain a good recording quality from the beginning of the recording operation. Specifically, the test writing region is preferably located at the inner diameter portion if the spiral direction with respect to the rotation direction of the optical recording medium 1 for recording/playback is directed towards the outer diameter portion, and the test writing region is preferably located at the outer diameter portion if the spiral direction is directed towards the inner diameter portion. In this way, excess movement of the optical pickup may be reduced and the operation time from test writing to recording may be reduced so that the recording may not be greatly influenced by a fluctuation of the suitable recording condition with the elapse of time.

In one example of recording the recording conditions on the recording layers 3 and 4, recording conditions of the same specification may be recorded on the recording layers 3 and 4. In such case, a recording condition and/or a condition for deriving a recording condition may be set for each of the recording layers 3 and 4. In this example, when the number of recording layers is increased, the recording condition format may not have to be changes and may instead be extended. Thereby, the present embodiment may be applied to optical recording media such as the DVD±R/RW or the CD-R/RW which have already become widespread as optical recording media with a single recording layer.

In another example of recording the recording conditions on the recording layers 3 and 4, a recording condition may be recorded on a first recording layer on which recording is to be conducted first (i.e., recording layer 3), and information for identifying the recording layer 3 may be recorded on the reflection film 7 that is paired with the recording layer 3. On the other hand, information for deriving a recording condition for the other recording layer 4 based on the recording condition for the first recording layer 3 is recorded on the recording layer 4. By using this method, the amount of information to be recorded as recording condition information may be reduced in the second recording layer 4 and onward. Thus, by adding surplus signals to improve the error correction performance, sufficient reading performance may be maintained even when the SNR decreases compared to that at the time of recording on the first recording layer.

In yet another example of recording the recording conditions on the recording layers 3 and 4, the recording conditions for all the recording layers 3 and 4, may be recorded on the first recording layer 3. In this example, maintaining compatibility with a single recording layer optical recording medium becomes difficult; however, a recording condition may not have to be read from the second recording layer 4 and onward so that the recording layer 4 may merely require a signal quality that is sufficient for reading the identification signal of the recording layer 4. It is noted that the first recording layer 3 on which recording is to be conducted first preferably corresponds to a recording layer that is positioned closest to the recording light incidence surface so that it receives little influence from other recording layers such as the recording layer 4. Alternatively, the first recording layer 3 on which recording is performed first may correspond to a recording layer that is positioned farthest from the incidence surface of the recording light. When the first recording layer 3 to be recorded first corresponds to the recording layer that is positioned farthest from the incidence surface of the recording light, recording on the second recording layer 4 may be realized without receiving influence from the preceding recording layers including the first recording layer 3 so that stable recording may be realized.

Further, in the optical recording medium 1 having plural recording layers 3 and 4, the amount of heat accumulated within an optical recording apparatus differs depending on whether recording is separately performed on each recording layer 3 and 4, or recording is successively performed on the recording layers 3 and 4. Accordingly, environmental conditions such as temperature may vary significantly. Particularly, when a laser diode is used as the light source, variations in the wavelength with respect to temperature occur. Thereby, in such case the recording condition information of the optical recording medium 1 preferably includes information pertaining to fluctuations of the recording conditions with respect to the temperature and the wavelength, for example. In this way, suitable recording may be realized regardless of the position on the optical recording medium 1 at which the recording is started.

[Signal Format]

In the following, specific examples of suitable signal formats in various configurations of the optical recording medium 1 are described with reference to FIGS. 2~5.

FIGS. 2~5 respectively represent first through fourth signal formats that are recorded on the recording guide trenches (tracks) 11 and 12 of the optical recording medium 1. FIG. 6 shows a signal format recorded on a guide trench of an optical recording medium having a single layer structure as a comparison example. In FIGS. 2~5, "standard information" refers to the corresponding standard of the optical recording medium 1. "Disk (or medium) configuration" refers to information that may include physical configuration information such as the size of the optical recording medium 1 and the track pitch of the guide trenches 11 and 12, the material of the recording layer, information pertaining to the start address and end address of the data region, and information pertaining to usage of the optical recording medium 1, for example. "Recording layer number" refers to the layer information for identifying each of the recording layers 3 and 4 by assigning differing values to the recording layers 3 and 4. "Vendor information" refers to vendor (manufacturer) identification information of the optical recording medium. "Version information" refers to the manufacture version information of the optical recording medium 1. "Waveform condition" describes the sensitivity fluctuation of the recording film with respect to the waveform. It is noted that portions of the signal format shown in FIG. 6 that correspond to portions of the signal format of FIGS. 2~5 are given the same description references.

[First Signal Format]

Figure 2:
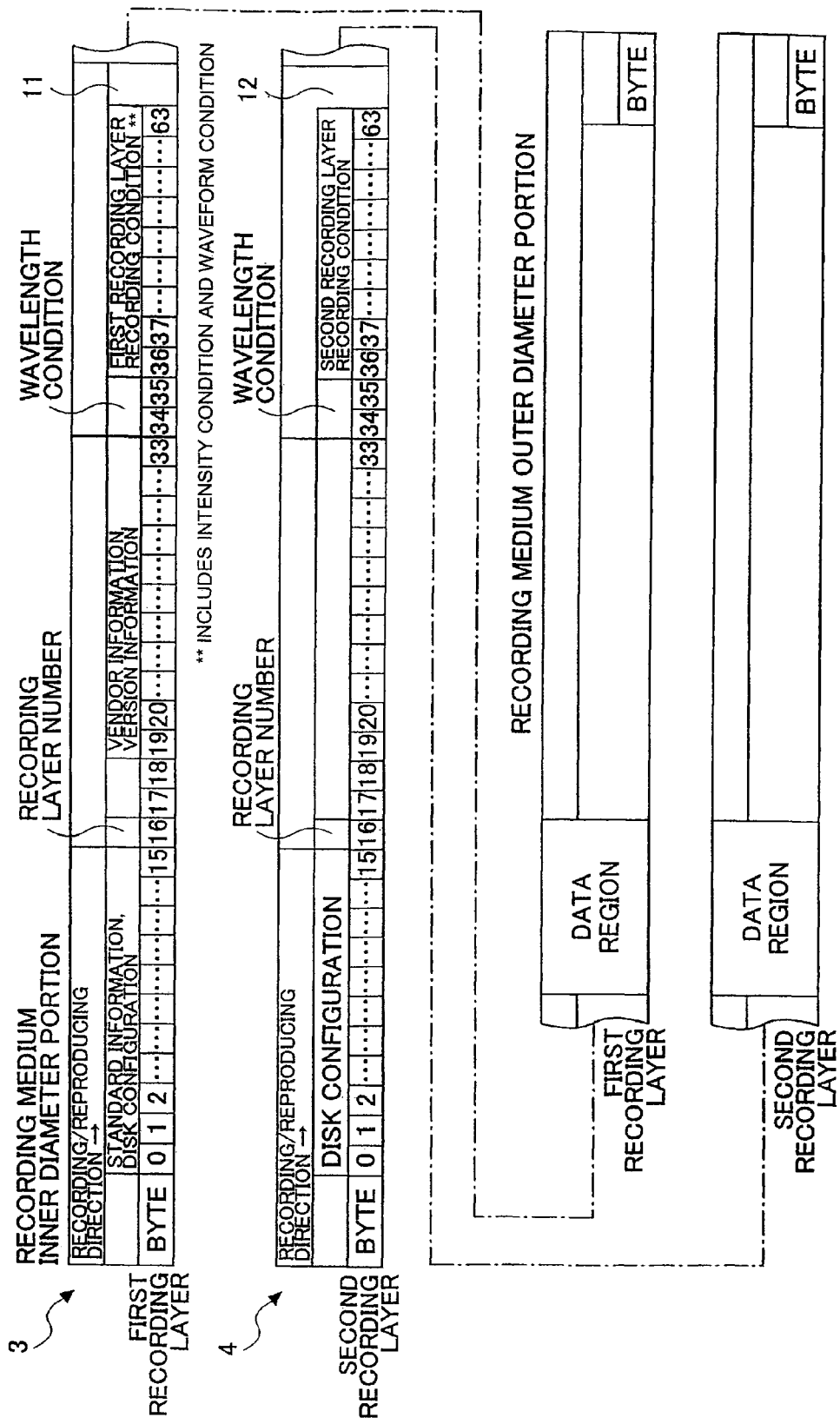
FIG. 2 is a diagram showing a first signal format of a guiding trench.

The first signal format shown in FIG. 2 is implemented in an optical recording medium 1 that uses the Parallel Track Path (PTP) method in which the first recording layer 3 and the second recording layer 4 respectively have spiral guide trenches 11 and 12 that are directed from the inner diameter portion to the outer diameter portion of the medium. In this case, on each of the guide trenches 11 and 12 of the first recording layer 3 and the second recording layer 4, information pertaining to a recording condition and layer information are preformatted at the inner diameter portion.

Thereby, to conduct recording on the first recording layer 3, recording condition information preformatted on the guide trench 11 of the first recording layer 3 is used to conduct test writing on the first recording layer 3 to derive a suitable recording condition, and recording is performed on the first recording layer 3 based on a direct recording condition. To conduct recording on the second recording layer 4, the optical pickup moves to the inner diameter portion of the optical recording medium 1, and the recording condition information preformatted on the guide trench 12 of the second recording layer 4 is used to conduct test writing to derive a suitable recording condition, and to realize recording based on a direct recording condition. By using such an optical recording medium 1, recording may be performed based on a suitable recording condition for each of the recording layers 3 and 4.

[Second Signal Format]

Figure 3:
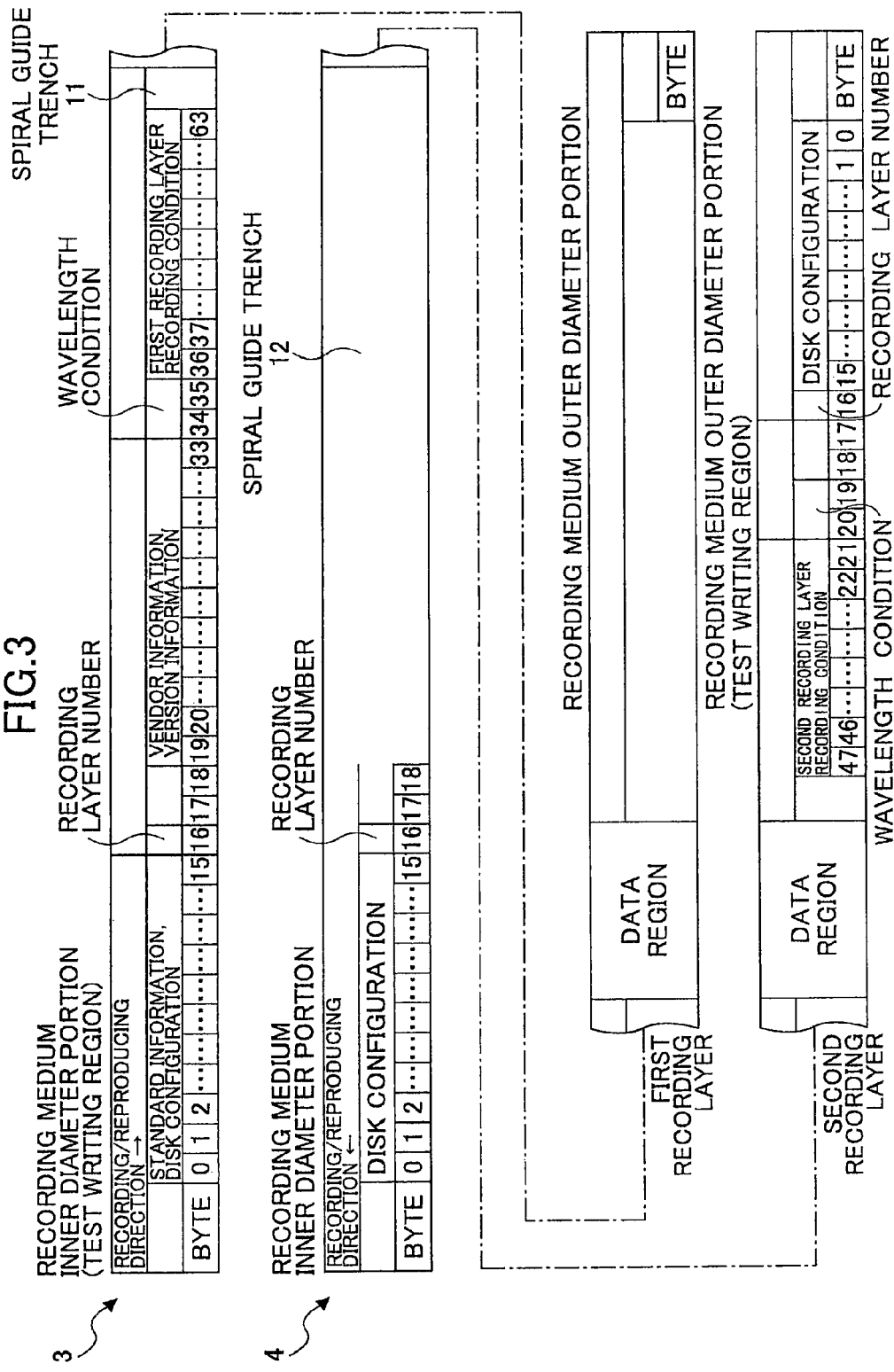
FIG. 3 is a diagram showing a second signal format of a guiding trench.

The second signal format shown in FIG. 3 is implemented in an optical recording medium 1 that uses the Opposite Track Path (OTP) method in which the first recording layer 3 has a spiral guide trench 11 that is directed from the inner diameter portion to the outer diameter portion of the medium, and the second recording layer 4 has a spiral guide trench 12 that is directed from the outer diameter portion to the inner diameter portion of the medium. In this case, information pertaining to a recording condition and layer information are preformatted on the inner diameter portion of the guide trench 11 of the first recording layer 3, and information pertaining to a recording condition and layer information are preformatted on the outer diameter portion guide trench 12 of the second recording layer 4.

Accordingly, recording condition information on the first recording layer 3 is used to conduct test writing on the first recording layer 3 to obtain a suitable recording condition, and direct recording is performed on the first recording layer 3 based on a direct recording condition. Then, to conduct recording on the second recording layer 4, the optical pickup that has moved to the outer diameter portion of the medium uses the recording condition information on the second recording layer 4 to conduct test writing on the outer diameter portion of the second recording layer 4 to obtain a suitable recording condition, and direct recording is performed on the second recording layer 4 based on a direct recording condition.

By using an optical recording medium 1 having such a configuration, the moving distance of the optical pickup from the first recording layer 3 to the second recording layer 4 may be reduced so that substantially continuous recording may be realized and recording based on a suitable recording condition may be performed on each of the recording layers 3 and 4. Also, the signal format recorded on the guide trench 11 of the first recording layer 3 is substantially identical to the comparison example shown in FIG. 6 for a single-layer recording layer, and thereby, high downward compatibility may be achieved in the optical recording medium 1 according to this configuration.

[Third Signal Format]

Figure 4:
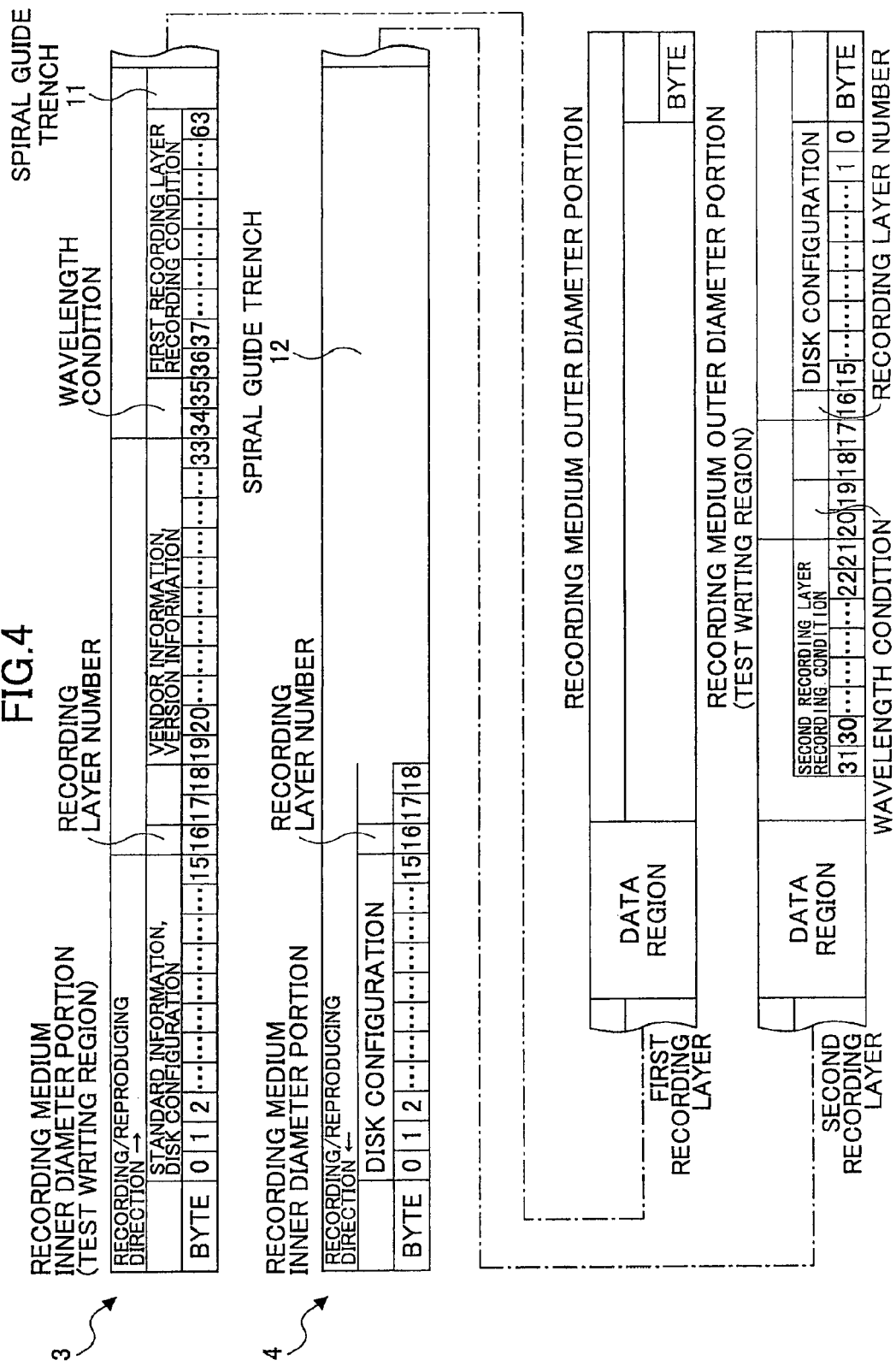
FIG. 4 is a diagram showing a third signal format of a guiding trench.

The third signal format shown in FIG. 4 is implemented in an optical recording medium 1 similar to that for the second signal format that uses the Opposite Track Path (OTP) method. However, unlike the second signal format, in the third signal format, indirect recording condition information for deriving a recording condition for the second recording layer 4 based on a recording condition for the first recording layer 3 is recorded on the guide trench 12 of the second recording layer 4 as information pertaining to a recording condition of the second recording layer 4. In this way, the amount of information required as recording condition information may be reduced compared to the second signal format.

Accordingly, as in the first and second signal formats, the recording condition of the first recording layer 3 is used to conduct test writing on the first recording layer 3 to obtain a suitable recording condition, and direct recording on the first recording layer 3 is performed based on a direct recording condition. Then, to conduct recording on the second recording layer 4, the optical pickup that has moved to the outer diameter portion of the medium uses the recording condition recorded on the second recording layer 4 to conduct test writing on the outer diameter portion of the second recording layer 4 to derive a suitable recording condition, and recording is conducted on the second recording layer 4 according to the recording condition of the second recording layer 4 that is derived from the recording condition of the first recording layer 3 based on the derivation information.

By using an optical recording medium having such a configuration, the moving distance of the optical pickup from the first recording layer 3 to the second recording layer 4 may be reduced so that substantially continuous recording may be realized and recording based on a suitable recording condition may be conducted on each of the recording layers 3 and 4. Also, it is noted that the signal format recorded on the guide trench 11 of the first recording layer 3 is substantially identical to the signal format shown in the comparison example of FIG. 6 for the single-layer recording layer, and high downward compatibility may be achieved in the optical recording medium 1. Further, since the recording condition of the second recording layer 4 merely includes a condition for modifying the recording condition of the first recording layer 3, the amount of information of the recording condition for the second recording layer may be reduced.

[Fourth Signal Format]

Figure 5:
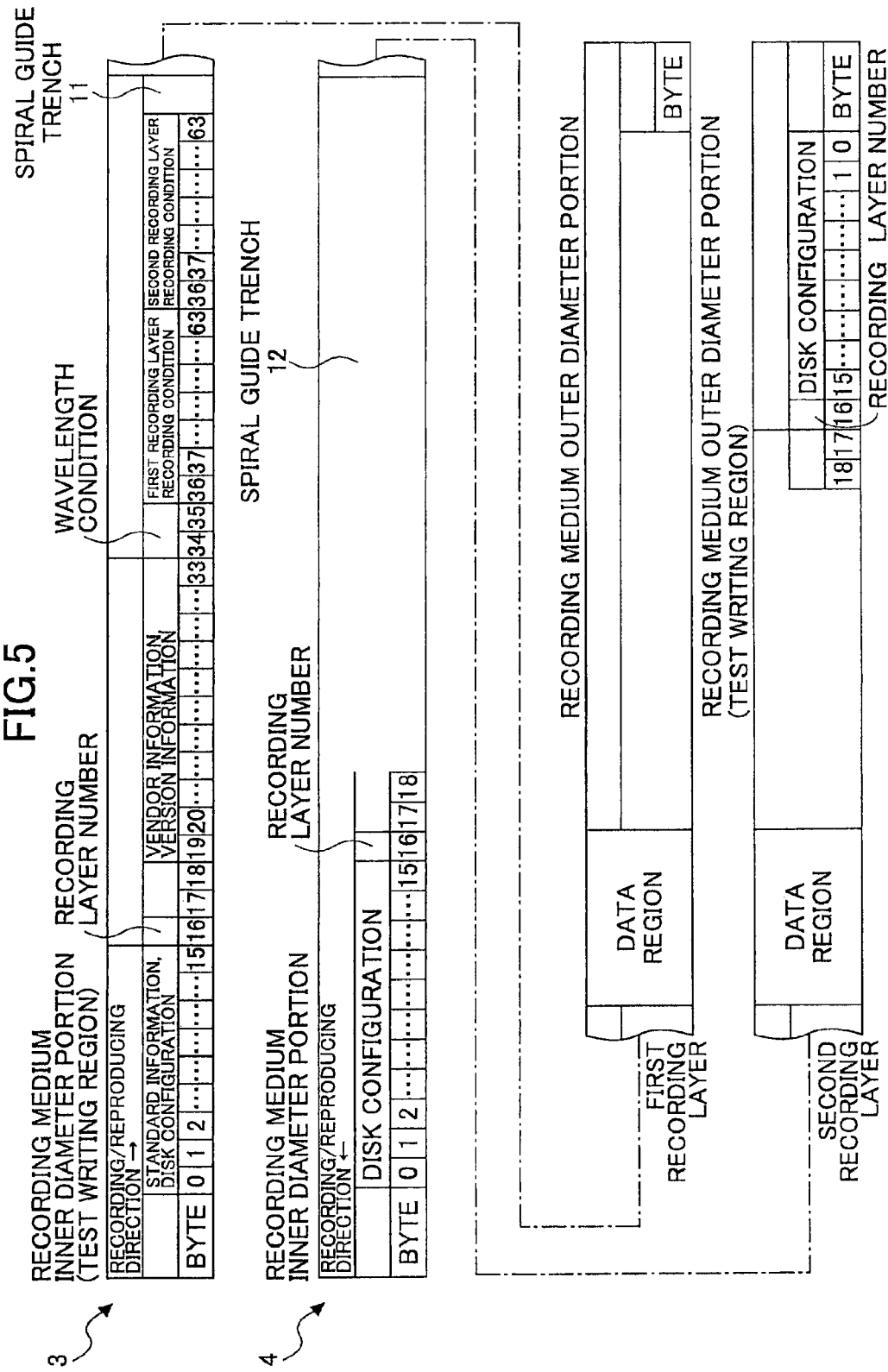
FIG. 5 is a diagram showing a fourth signal format of a guiding trench.
Figure 6:
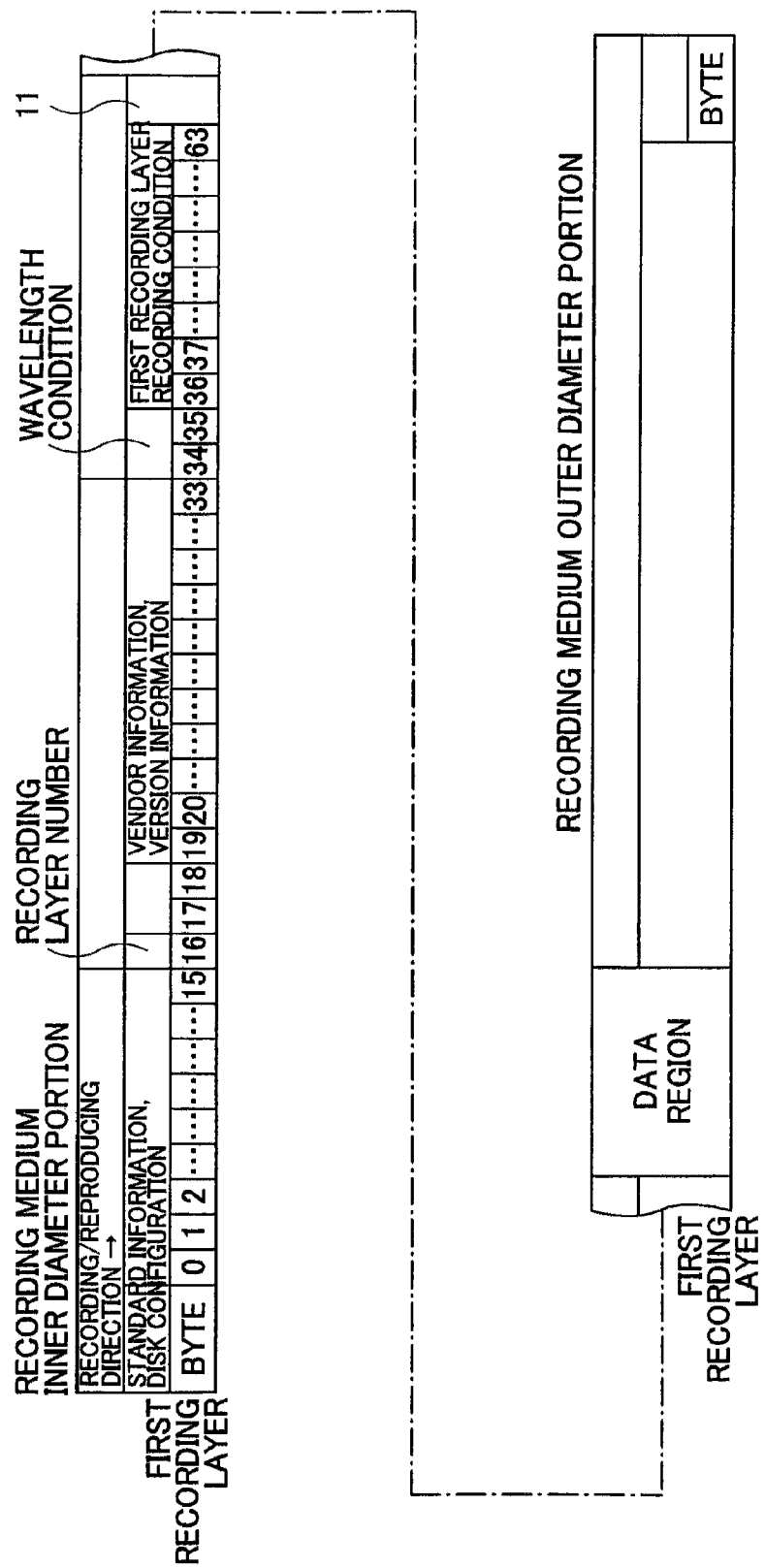
FIG. 6 is a diagram showing a comparison example of a signal format of a guiding trench.

The fourth signal format shown in FIG. 5 may be implemented in an optical recording medium 1 similar to that for the second and third signal formats that uses the Opposite Track Path (OTP) method. However, unlike the second and third signal formats, in the fourth signal format, all information items pertaining to recording conditions for the recording layers 3 and 4 are recorded on the guide trench 11 of the first recording layer 3, while layer information is still recorded on each of the recording layers 3 and 4.

Accordingly, recording on the first recording layer 3 is conducted in a manner similar to that used in the first through third signal formats. That is, the recording condition for the first recording layer 3 that is recorded on the first recording layer 3 is used to conduct test writing on the first recording layer 3 to derive a suitable recording condition, and direct recording is performed on the first recording layer 3 based on a direct recording condition. Then, to conduct recording on the second recording layer 4, the optical pickup that has moved to the outer diameter portion of the medium recognizes the layer information recorded on the second recording layer 4, and uses the recording condition for the second recording layer 4 that is read from the first recording layer 3 to conduct test writing on the outer diameter portion of the second recording layer 4 to derive a suitable recording condition, and recording is conducted on the second recording layer 4 based on the derived recording condition.

By using an optical recording medium 1 having such a configuration, the moving distance of the optical pickup from the first recording layer 3 to the second recording layer 4 may be reduced so that substantially continuous recording may be realized and recording may be conducted under a suitable recording condition for each of the recording layers 3 and 4. Also, since the recording condition for the second recording layer 4 is recorded on the first recording layer 3, recording on the second recording layer 4 may be realized by simply recognizing the layer information for identifying the second recording layer 4.

[Information Recording Method]

Figure 7:
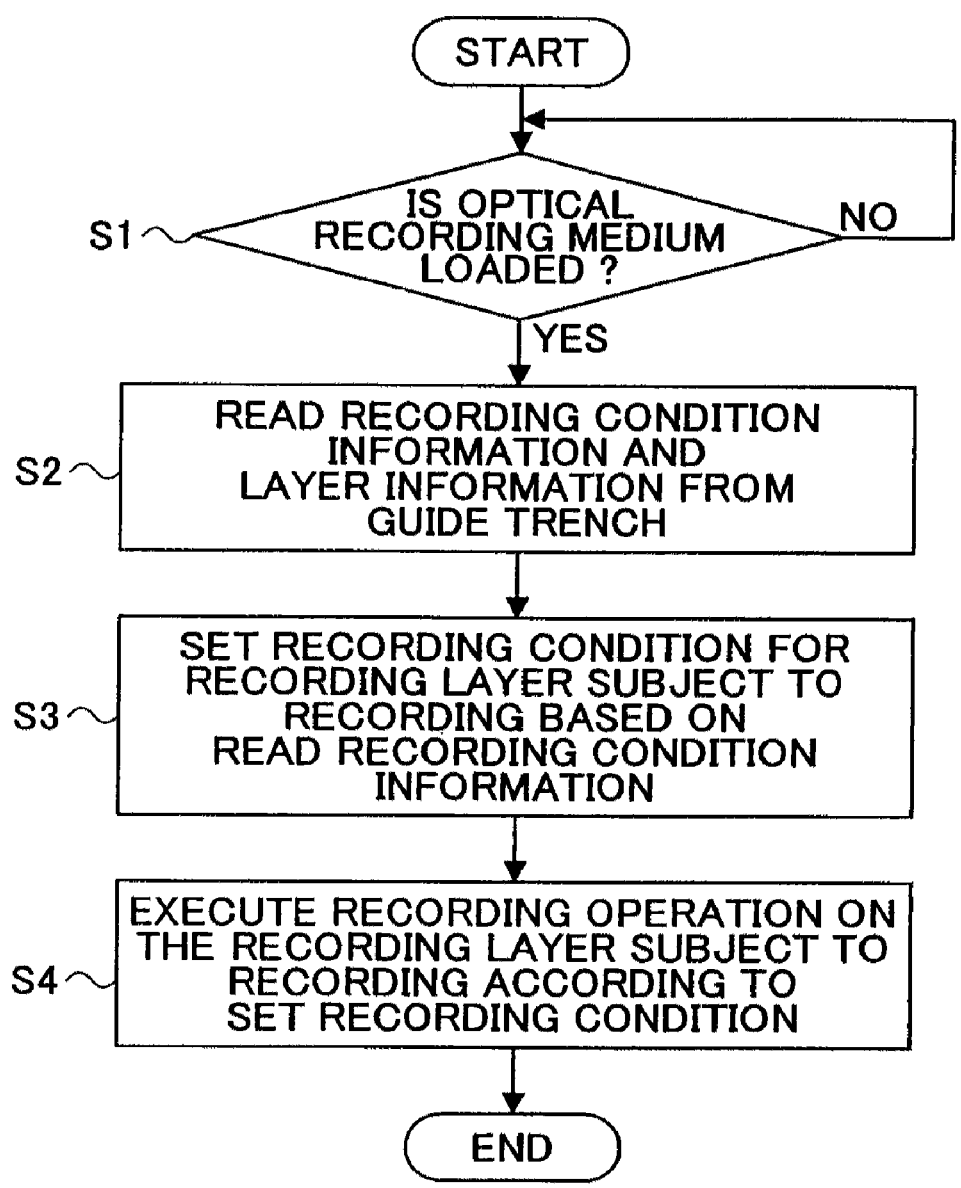
FIG. 7 is a flowchart illustrating an information recording method according to an embodiment of the present invention.

A schematic process as is illustrated in FIG. 7 may be used as an information recording method in a case where any one of the optical recording media 1 implementing the above-described first through fourth signal formats is loaded in an optical information recording apparatus. FIG. 7 is a flowchart illustrating an information recording method according to an embodiment of the present invention.

According to FIG. 7, first, in step S1, a determination is made as to whether an optical recording medium is loaded. When an optical recording medium 1 is loaded and a positive determination (YES) is made in step S1, the following steps are undertaken before conducting a recording operation on the optical recording medium 1. In step S2 (condition reading step), information pertaining to a recording condition and layer information for identifying the recording layer 3/4 are read from the guide trench 11/12 of the optical recording medium 1. Then, in step S3 (recording condition setting step), based on the information pertaining to a recording condition and layer information for identifying the recording layer 3/4 that are read in step S2, a recording condition is set for the recording layer 3/4 that is subject to a recording operation. Then, in step S4 (recording operation execution step), a data recording operation is conducted to record user data, for example, on the recording layer 3/4 that is subject to the recording operation according to the recording condition set in step S3.

According to the present embodiment, even with an optical recording medium 1 having a multi-layer structure with plural recording layers 3 and 4, information pertaining to a recording condition and layer information for identifying each of the recording layers that are recorded on the guide trenches 11 and 12 may be read and recording conditions for the recording layer 3 or 4 may be set to conduct a data recording operation. Thereby, recording under a suitable recording condition may be realized on each of the recording layers 3 and 4.

[Modification Example]

In the above descriptions of recording information on the multi-layered recording layers 3 and 4, the track format is described as implementing a conventional format of recording on the grooves (guide trenches 11 and 12) of the recording layers 3 and 4 (identical results may be obtained by a format of recording on lands or both the grooves and lands of the recording layers). However, other formats may be used such as a format of alternatingly setting a groove track and a land track as recording positions of the multi-layer recording layers depending on whether the recording layer corresponds to an odd numbered layer or an even numbered layer. For example, a groove track may be set as the recording position with respect to the first recording layer and its wobble, and a land track may be set as the recording position with respect to the second recording layer and its wobble. In conducting recording on the second recording layer of a dual-layer recording medium that uses an organic dye material as its main material, a relatively deep mark with respect to a layer depth direction has to be formed on the second recording layer. However, when a mark with such depth is formed on the second recording layer, heat generated upon conducting the recording is likely to penetrate to the land side owing to structural reasons so that degradation occurs in the recording quality. Thereby, the track format described above may be used to avoid such inconvenience.

Figure 8:
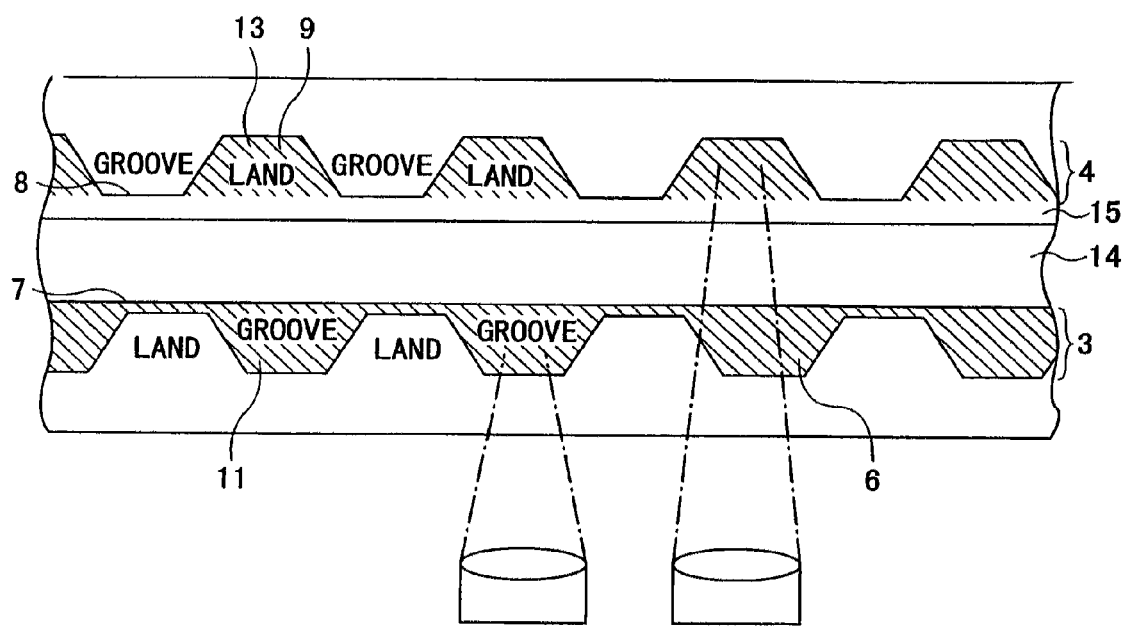
FIG. 8 is a cross-sectional diagram showing a modified example of an optical recording medium that implements a different tracking scheme.

In the following, this track format is described with reference to FIG. 8. FIG. 8 is a cross-sectional diagram showing a configuration of an optical recording medium according to a modification example that implements the above-described track format. It is noted that in FIG. 8, elements that are identical to those shown in FIG. 1 are given the same numerical references and their descriptions are omitted. Also, the recording/reproducing light is indicated by a one-dot-dashed line in this drawing.

Referring to FIG. 8, on the first recording layer 3, a recording film 6 having a trench structure in the light irradiation direction is formed with respect to the reflection layer 7, and on the second recording layer 4, a recording film 9 having a trench structure in the light irradiation direction is formed with respect to the reflection layer 8. In a case where the optical recording medium 1 corresponds to a disk medium, the trench structure is formed into a spiral path that starts from the center of the disk medium and is directed towards the outer diameter side, and an information recording/playback apparatus follows this trench to conduct playback and recording of information. Generally, the trench that is positioned closer to the incidence surface of the of the recording/reproducing light is referred to as a groove track 11, and the trench that is positioned further away from the incidence surface is referred to as a land track 13. On the first recording layer 3, the recording film 6 is formed on the groove track 11, and on the second recording layer 4, the recording film 9 is formed on the land track 13. In other words, the recording films of the first recording layer 3 and the second recording layer 4 are respectively formed as tracks having differing configurations.

Figure 9:
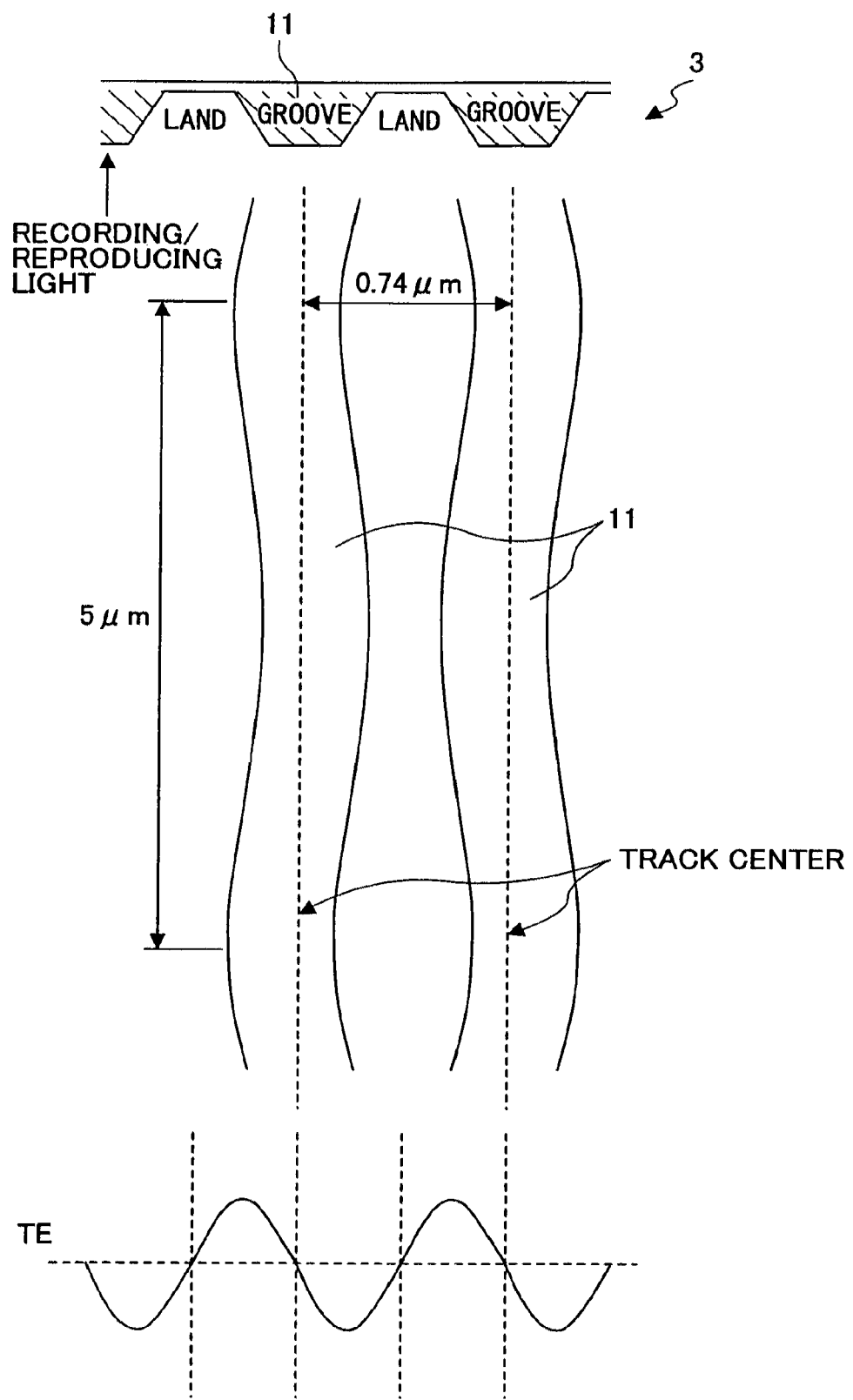
FIG. 9 is a diagram showing a wobble signal on the groove track of the optical recording medium of FIG. 8.

More specifically, in the trench structure of the first recording layer 3, the groove track 11 is formed by the recording film 6. The groove track 11 is wobbled as is shown in FIG. 9, and the wobble signal provided on the groove track 11 may include position information within the medium (disk) plane and recording power and recording pulse form for conducting OPC, for example. FIG. 9 illustrates the wobble signal on the groove track of the optical recording medium shown in FIG. 8.

Figure 10:
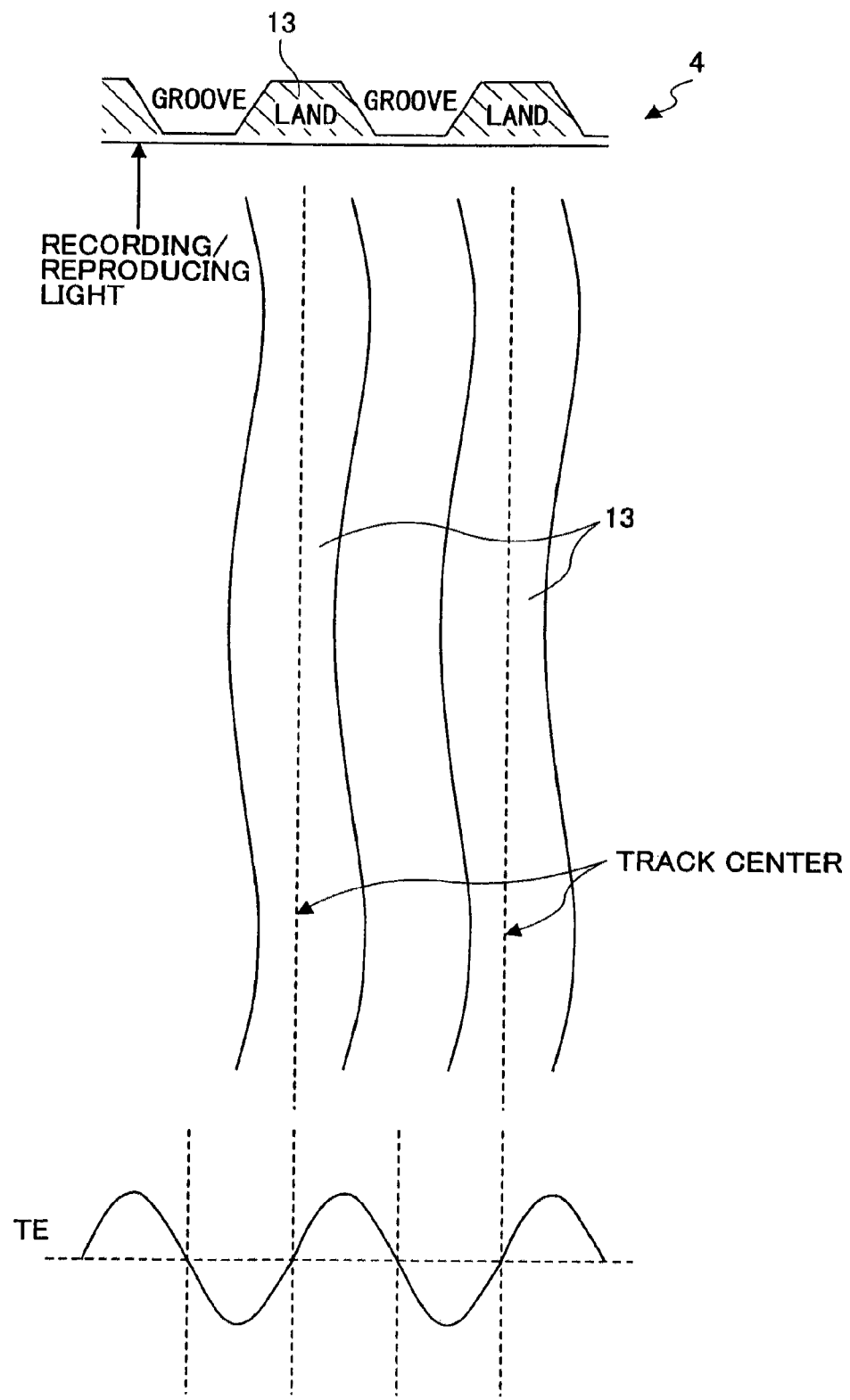
FIG. 10 is a diagram showing a wobble signal on a land track of the optical recording medium of FIG. 8.

The second recording layer 4 is formed over the first recording layer 3 with a bonding layer 10 and/or an inorganic protective layer 14 placed in between. Unlike the first recording layer 3, the recording film 9 of the recording layer 4 is formed on the land track 13, and the wobble signal is also recorded on the land track 13 as is shown in FIG. 10. FIG. 10 shows a wobble signal on the land track of the optical recording medium shown in FIG. 8. This wobble signal may include position information of the second recording layer 4, and the recording power and recording pulse form for conducting OPC, for example.

Even in an optical recording medium implementing a track format as described above, the first through fourth signal formats illustrated in FIGS. 2~5 may be implemented, and recording according to a suitable recording condition may be conducted for each of the recording layers 3 and 4.

It is noted that in FIGS. 9 and 10, waveforms of tracking error signals (TE) for the groove track 11 and the land track 13 are respectively shown at the bottom section of the drawings as references.

It is further noted that the optical recording medium according to the present invention is not limited to a disk medium. In fact, the present invention may also be applied to other various types of optical recording media.

Also, the present invention is not limited to the preferred embodiments described above, and various modifications and changes may be made without departing from the scope of the present invention.

What is claimed is:

1. An optical recording medium comprising:
a plurality of recording layers configured to store data, each recording layer having spiraling tracks for guiding recording light and arranged into an opposite track path multi-layer structure; and
a test writing region provided at each of the recording layers for performing test writing to determine a recording condition for recording data on each of the recording layers which test writing region is provided at least at an inner diameter portion of a corresponding recording layer of the recording layers if a spiraling direction of a corresponding track of the corresponding recording layer is directed from an inner diameter side to an outer diameter side, and which test writing region is provided at least at an outer diameter portion of the corresponding recording layer if the spiraling direction of the corresponding track is directed from the outer diameter side to the inner diameter side,
wherein first recording condition information is preformatted in one of the recording layers for deriving recording conditions for the one recording layer from an intensity condition and a waveform condition specified by second recording condition information preformatted in another one of the recording layers.

2. The optical recording medium as claimed in claim 1, wherein recording layer identification information for identifying the recording layers is preformatted on the tracks.

3. The optical recording medium as claimed in claim 2, wherein the multi-layer structure recording layers alternatingly include a groove track and a land track as recording positions according to a layering order of the recording layers.

4. The optical recording medium as claimed in claim 2, wherein the recording layer identification information for identifying the recording layers is preformatted as pits or grooves of the tracks.

5. The optical recording medium as claimed in claim 2, wherein the recording layer identification information for identifying the recording layers is recorded on the tracks outside data regions of the tracks.

6. The optical recording medium as claimed in claim 2, wherein: the recording layer identification information for identifying the recording layers is provided on the tracks at an inner diameter portion of a corresponding track if a spiraling direction of the corresponding track is directed from an inner diameter side to an outer diameter side, and at an outer diameter portion of the corresponding track if the spiraling direction of the corresponding track is directed from the outer diameter side to the inner diameter side.

7. The optical recording medium as claimed in claim 1, wherein: the recording layers individually include recording layer identification information for identifying the recording layers.

8. The optical recording medium as claimed in claim 1, wherein a first recording layer of the recording layers on which data recording is to be conducted first corresponds to a recording layer of the recording layers that is positioned closest to a recording light incidence side.

9. The optical recording medium as claimed in claim 1, wherein a first recording layer of the recording layers on which data recording is to be conducted first corresponds to a recording layer of the recording layers that is positioned farthest from a recording light incidence side.

10. An information recording method for recording information on an optical recording medium including a plurality of recording layers configured to store data which recording layers each have spiraling tracks for guiding recording light and are arranged into an opposite track path multi-layer structure, and a test writing region provided at each of the recording layers for performing test writing to determine a recording condition for recording data on each of the recording layers which test writing region is provided at least at an inner diameter portion of a corresponding recording layer of the recording layers if a spiraling direction of a corresponding track of the corresponding recording layer is directed from an inner diameter side to an outer diameter side, and which test writing region is provided at least at an outer diameter portion of the corresponding recording layer if the spiraling direction of the corresponding track is directed from the outer diameter side to the inner diameter side, wherein first recording condition information is preformatted in one of the recording layers for deriving recording conditions for the one recording layer from an intensity condition and a waveform condition specified by second recording condition information preformatted in another one of the recording layers, the method comprising the steps of:

recording data on one of the recording layers of the optical recording medium;

performing test writing on the test writing region of an adjacent recording layer of the recording layers that is adjacent to said one of the recording layers and determining the recording condition for recording data on said adjacent recording layer; and recording data on the adjacent recording layer according to the determined recording condition for said adjacent recording layer.

* * * * *